United States Patent [19]
Barker et al.

[11] Patent Number: 5,264,959
[45] Date of Patent: Nov. 23, 1993

[54] TEMPERATURE-INSENSITIVE PHASE-MATCHED OPTICAL HARMONIC CONVERSION CRYSTAL

[75] Inventors: Charles E. Barker, Sunnyvale; David Eimerl; Stephan P. Velsko, both of Livermore, all of Calif.; David Roberts, Sagamore Hills, Ohio

[73] Assignee: The United States of America as represented by the United States Department of Energy, Washington, D.C.

[21] Appl. No.: 981,636

[22] Filed: Nov. 25, 1992

[51] Int. Cl.$^5$ .............................................. G02F 1/37
[52] U.S. Cl. ...................................... 359/328; 252/582
[58] Field of Search ............... 385/122; 372/21, 22; 359/326–332; 252/582, 584

[56] References Cited

U.S. PATENT DOCUMENTS

| | | | |
|---|---|---|---|
| 3,965,375 | 6/1976 | Bergman, Jr. et al. | 359/328 |
| 4,599,727 | 7/1986 | Jenssen | 372/41 |
| 4,697,100 | 9/1987 | Eimerl | 359/328 |
| 4,876,688 | 10/1989 | Wang et al. | 372/22 |
| 5,195,104 | 3/1993 | Geiger et al. | 359/330 X |

OTHER PUBLICATIONS

Barker et al., "Temperature-insensitive phase matching for second-harmonic generation in deuterated l-arginine phosphate", *Journal of the Optical Society of America B*, vol. 8, No. 12, pp. 2481–2492 (Dec. 1991).

*Primary Examiner*—John D. Lee
*Attorney, Agent, or Firm*—Henry P. Sartorio; Roger S. Gaither; William R. Moser

[57] ABSTRACT

Temperature-insensitive, phase-matched harmomic frequency conversion of laser light at a preferred wavelength of 1.064 microns can be achieved by use of a crystal of deuterated l-arginine phosphate. The crystal is cut and oriented so that the laser light propagates inside the crystal along one of several required directions, which correspond to a temperature-insensitive, phase-matching locus. The method of measuring and calculating the temperature-insensitive, phase-matching angles can be extended to other fundamental wavelengths and other crystal compositions.

5 Claims, 7 Drawing Sheets

TEMPERATURE-INSENSITIVE PHASE-MATCHED OPTICAL HARMONIC CONVERSION CRYSTAL

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to the use of nonlinear devices for the conversion of optical and near optical frequencies to higher or lower values. Such devices include second harmonic generators and parametric amplifiers. Specifically, deuterated l-arginine phosphate crystals in a particular crystallographic orientation with incident light radiation will perform this conversion independently of temperature at a preferred frequency of 1.064 μm with high efficiency.

2. Description of Related Art

The application of lasers to research and applied projects in 1960 was limited by the number of frequencies at which the lasers operated. Nonlinear devices were the first major advance in enlarging the scope of operating frequencies. Nonlinear devices can convert a given frequency of electromagnetic radiation to a higher value by creating a radiation field at the new frequency, or can convert two frequencies to their sum or difference value. Although nonlinear devices significantly broadened the spectrum of frequencies of laser operation, the majority of the optical spectrum was still unavailable.

The development of dye lasers opened up the entire visible spectrum and a significant portion of the infrared and ultraviolet regions for laser operation. Nonlinear devices have advantages over dye lasers, however, which account for their continued use. Nonlinear devices are simpler and cleaner to operate than dye lasers, and more rugged for applied use. In many regions of the spectrum, nonlinear devices are more efficient than dye lasers and can convert readily available 1.064 μm light by stepwise doubling to 532 nm and then to 266 nm.

Optical harmonic generation, first observed in 1961, has been widely used to further extend the operational wavelengths of lasers, and nonlinear devices are commonly used as optical harmonic generators. The discovery of second harmonic generation was made by Franken et al. and described in "Generation of Optical Harmonics", *Phys. Rev. Lett.*, Vol. 7, No. 4, pp. 118–119 (Aug. 15, 1961). Franken focused a 694.3 nm light beam from a ruby laser onto a quartz crystal and found that some of the light was converted to second harmonic light, which is exactly half the wavelength (347.15 nm), with photons being twice the energy of the incident light.

The second harmonic is generated as incident light interacts with the electrons in a nonlinear material, such as quartz. In nonlinear crystals, incident light travels at different speeds for different directions of vibration within the crystal, and therefore the optical properties of the crystal (e.g., dielectric constant) can be different along each of three orthogonal crystal axes. Conversely, light travels with the same speed, regardless of its direction of vibration, within isotropic media.

The light from a point source in an anisotropic crystal spreads out in two wave surfaces, an ordinary ray and an extraordinary ray, with one traveling faster than the other. When the extraordinary ray travels faster than the ordinary ray in a uniaxial crystal, the crystal is considered negative (−); when the extraordinary ray travels slower, the crystal is considered positive (+).

The two resulting rays of light generated by the nonlinear material are at the incident frequency (fundamental harmonic motion), and at twice the incident frequency (second harmonic motion). The strongest interaction of light beams occurs when the phase velocity of the two waves are the same, or phase-matched. The efficiency of the second harmonic generation (SHG) process is a function of the phase mismatch between the incident wave and the generated second harmonic wave, and highly efficient frequency conversion of intense laser radiation demands careful attention to the problem of phase mismatching.

The production efficiency of the second harmonic is also limited by the natural dispersion of the nonlinear material, which causes different wavelenghts of light to travel at different speeds. Dispersion causes the frequency-doubled light in the nonlinear material to travel more slowly than the incident radiation, resulting in the incident light being out of phase with the slower, frequency-doubled light. The two waves of light destructively interfere, and the intensity of frequency-doubled light leaving the crystal is severely diminished. Dispersion in the refractive indices of all materials usually prevents phase-matching from occurring unless special steps are taken.

The application of nonlinear phenomena to practical devices was limited because of phase mismatching until a discovery by Giormaine and Kleinman (U.S. Pat. No. 3,234,475). They used the birefringence of an optically anisotropic crystal to offset the phase mismatch caused by dispersion. Today, the most common method of achieving phase-matching in crystals is by using birefringent crystals.

In a birefringent material, an incident beam of light is split into two waves traveling at different velocities. In a birefringent negative uniaxial crystal, the extraordinary ray travels faster than the ordinary ray. While dispersion lowers the velocity of the frequency-doubled light with respect to the incident light, birefringence has the opposite effect. If the ordinary ray is at the incident light frequency, and the extraordinary ray is the frequency-doubled light, then both dispersion and birefringence act on the frequency-doubled light, and the two effects can cancel each other out.

The magnitude of birefringence depends on the angle of incidence (the angle between the incident beam and the optic axis of the crystal), and therefore an angle can be chosen for which the birefringence is sufficiently large to compensate for the effects of dispersion. When phase-matching is accomplished, the power of the generated wave is many orders of magnitude greater than in non-phase-matched interactions, and the production efficiency of the frequency-doubled light rises dramatically. The phase-matching conditions are achieved by choosing the proper temperature and propagation direction, and depend on the wavelength of the incident radiation. This technique of angle tuning the birefringence achieves minimum angular sensitivity at a non-critical phase-matching angle of incidence of 90°.

Although all sources of phase mismatch should be controlled, the relative importance of each source is determined by the application. The thermal contributions to phase mismatch are especially crucial with harmonic generation of high average power laser radiation. Small amounts of absorption of the fundamental or harmonic wavelengths lead to large thermal fluctuations, thermal gradients, and thermal stress, all of which cause variations in the refractive index. The propagation direction required to obtain phase-matching is highly dependent on the refractive indices, and therefore the thermal effects in the nonlinear crystal must be carefully controlled to minimize phase mismatch and maintain efficient frequency conversion. Various schemes such as electroptic tuning, piezo-optic tuning, beam shaping, and gas-cooled multiple plate designs have been proposed to control thermal loads and compensate for thermal effects in nonlinear optical crystals used for high average power harmonic generation.

A technique for controlling the birefringence-dispersion relationship by exploiting the temperature dependence of phase-matching is described in U.S. Pat. No. 3,262,658 by Ballman et al. (1966). The invention attains noncritical phase-matching conditions and controls the magnitude of birefringence by operating at a fixed temperature. The temperature must be closely controlled, since small variations will detune the crystal.

The number of effective and efficient nonlinear materials for second harmonic generation, which take advantage of the temperature tuning method, remains limited. One example of a crystal that performs stepwise frequency doubling is described in U.S. Pat. No. 3,965,375 by Bergman et al. (1976). A lithium perchlorate trihydrate ($LiClO_4 \cdot 3H_2O$) crystal is employed to achieve noncritical phase-matching at about 530 nm and at room temperature, and is insensitive to temperature variations.

The use of thermal management techniques can be obviated by the use of nonlinear crystals that possess temperature-insensitive, phase-matching directions. An ideal crystal would have a large nonlinear coupling in a phase-matching direction that has a zero-valued rate of change with respect to temperature for the incident frequency.

L-arginine phosphate and deuterated l-arginine phosphate (dLAP) are relatively recent additions to the set of materials known to provide efficient frequency conversion in the near infrared and visible regions of the electromagnetic spectrum. The dLAP crystal was patented in U.S. Pat. No. 4,697,100 by Eimerl (Sep. 29, 1987) as a new composition of matter for application in harmonic conversion of laser light, especially in the one micron wavelength region. The measurement and calculation of unique temperature-insensitive, phase-matching directions in these crystals are presented in the following invention description.

SUMMARY OF THE INVENTION

The invention is a deuterated l-arginine phosphate crystal (dLAP) for optical harmonic generation, having temperature-insensitive, phase-matching loci at a fixed fundamental wavelength. This invention can accomplish frequency doubling of the very important 1.064 micron line of the Nd-YAG laser to obtain 532 nm light under critical, temperature-insensitive, phase-matched conditions, thereby avoiding the need for temperature tuning apparatus.

Thermal contributions to phase mismatch are critical in high average power applications, and therefore the existence of temperature-insensitive phase-matching directions in a material that provides a significant optical nonlinearity is extremely important for high average power harmonic conversion devices. The dLAP conversion crystal is potentially of use in medium and high average power laser systems.

In one embodiment of the invention, a dLAP crystal is cut and oriented such that the normal directions of its input and output faces, through which a laser beam passes, lie at a polar angle of about 33.3° relative to the acute bisectrix or alpha axis of the crystal and at about one of the following azimuthal angles relative to the alpha-gamma plane of the crystal: +21.5°, −21.5°, +158.5°, or −158.5°. The alpha, beta, and gamma axes are the principal dielectric axes of the crystal with $n_\alpha < n_\beta < n_\gamma$. The crystal provides temperature-insensitive type I phase-matching for second-harmonic generation from a normally-incident or near normally-incident laser beam at a preferred fundamental wavelength of 1.064 $\mu$m.

Small errors in the cutting of the face normal directions of the second harmonic generation crystal for temperature-insensitive phase-matching may be compensated for by reorientation of the crystal about both the sensitive and insensitive phase-matching directions. Other fundamental wavelengths may be frequency-doubled with temperature-insensitive phase-matched second harmonic generation in dLAP by varying the specified angles. In addition, the general methods described in the present invention can be extended to other crystals that satisfy certain conditions.

DETAILED DESCRIPTION OF THE INVENTION

General Description

The invention is a crystalline body of deuterated l-arginine phosphate (dLAP) that demonstrates temperature-insensitive, phase-matching directions for second harmonic generation (SHG). The directions for the type I locus lie within a few degrees of the directions of maximum nonlinear coupling for generation of the second harmonic of 1.064 μm light. The composition of dLAP is represented by the chemical formula $(X_2N)_2CNX(CH_2)_3CH(NX_3)^+COO^-.X_3PO_4.X_2O,$ where one or more of the X's represent deuterium, and any remaining X locations are hydrogen. Deuterated L-arginine phosphate forms monoclinic crystals ($a \neq b \neq c$ and $\alpha = \gamma = 90° \neq \beta$) with space group symmetry $P2_1$. Further description of the material is given in the Eimerl patent (U.S. Pat. No. 4,697,100), which is incorporated by reference.

No simple closed-form mathematical expression completely describes the phase-matching loci of biaxial crystals, but one can obtain simple expressions for the points of intersection of the phase-matching loci with the principal dielectric planes of the crystal (i.e., the extremal points of the phase-matching loci and the rates at which these points change with temperature). Simple expressions for the phase-matching angles in the principal planes, like those obtained for uniaxial crystals, can be found easily. The procedure for finding the phase-matching angles is particularly simple for dLAP, which has phase-matching behavior similar to a negative uniaxial crystal.

A uniaxial crystal with ideal crystallography for temperature-insensitive, phase-matching loci with large nonlinear coupling is extremely improbable. Regardless of the dispersion and birefringence displayed by the thermal coefficients of refraction ($dn_o/dT$ and $dn_e/dT$), symmetry constrains the phase-matching locus to a circular cone of half-angle $\theta_{PM}$ centered on the optic axis of the crystal. As a function of temperature, this cone can only change size, not shape. Therefore, to produce a zero-valued thermal rate of change of phase-matching direction ($d\theta_{PM}/dT=0$), the entire locus must be stationary with respect to temperature. This situation only occurs if the refractive indices and thermal coefficients of refraction satisfy an equality constraint, which is wavelength dependent.

Biaxial crystals are not as restrictively constrained in the thermal behavior of their phase-matching loci, although the loci are significantly more complicated. Unlike uniaxial crystals, whose phase-matching loci are described by a constant polar angle $\theta_{PM}$, the phase-matching loci of biaxial crystals are described by a polar angle $\theta$ that is a function of an azimuthal angle $\phi$ (usually referred to the principle dielectric axes or one of the optic axes of the crystal). The thermal rate of change of the polar angle, $d\theta/dT$, is also a function of the azimuthal angle, $\phi$. Consequently, while the phase-matching locus retains its shape, the aspect ratio of that shape can change as the temperature changes. The refractive indices and thermal coefficients of refraction satisfy a set of inequality constraints, which leads to specific directions in the phase-matching locus that are temperature-insensitive.

Specific Description

Figure 1:
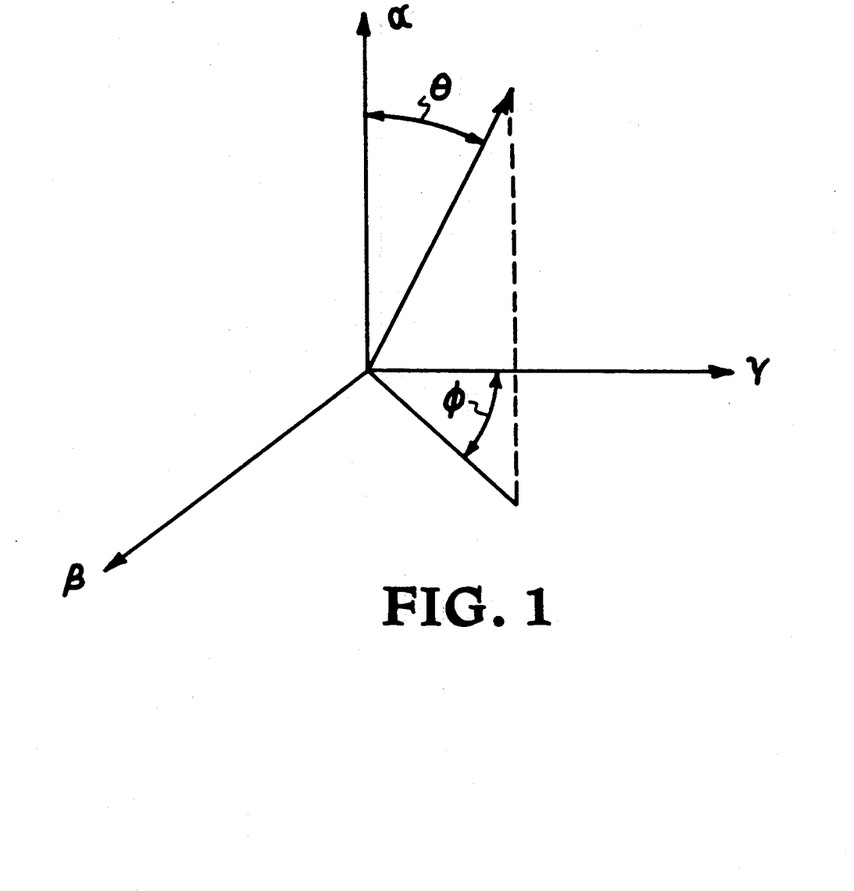
FIG. 1. Spherical polar coordinate system for calculating phase-matching directions.

The propagation direction of a plane wave inside a nonlinear crystal is described by an ordinate system shown in FIG. 1. The principal dielectric axes are $\alpha$, $\beta$, and $\gamma$, with refractive indices $n_\alpha < n_\beta < n_\gamma$. A polar angle $\theta$ is defined relative to the $\alpha$ axis, and an azimuthal angle $\phi$ is defined relative to the $\alpha$-$\gamma$ plane. A plane wave propagating in the $\alpha$-$\beta$ plane at an angle $\theta$ from the $\alpha$ axis sees two possible refractive indices:

[1] for an electric field polarized parallel to the $\alpha$-$\beta$ plane $$n_1^{(\alpha\beta)} = \left(\sqrt{\frac{\sin^2\theta}{n_\alpha^2} + \frac{\cos^2\theta}{n_\beta^2}}\right)^{-1}, \text{ and}$$

[2] for an electric field polarized perpendicular to the $\alpha$-$\beta$ plane (i.e., parallel to $\gamma$)

$$n_2^{(\alpha\beta)} = n_\gamma.$$

A plane wave propagating in the $\alpha$-$\gamma$ plane at an angle $\theta$ from the $\alpha$ axis will see a different pair of refractive indices:

[3] for an electric field polarized parallel to the $\alpha$-$\gamma$ plane $$n_1^{(\alpha\gamma)} = \left(\sqrt{\frac{\sin^2\theta}{n_\alpha^2} + \frac{\cos^2\theta}{n_\gamma^2}}\right)^{-1}, \text{ and}$$

[4] for an electric field polarized perpendicular to the $\alpha$-$\gamma$ plane (i.e., parallel to $\beta$)

$$n_2^{(\alpha\gamma)} = n_\beta.$$

The refractive indices at the fundamental frequency ($\omega$) and second harmonic frequency ($2\omega$) are related for phase-matched, collinear second harmonic generation in a material exhibiting normal dispersion. For type I phase-matching, where the two fundamental waves have parallel polarizations and $n_{fast}(\omega) < n_{slow}(\omega)$, $$n_{fast}(2\omega) = n_{slow}(\omega). \quad [5]$$

For type II phase-matching, where the two fundamental waves have orthogonal polarizations, $$n_{fast}(2\omega) = \tfrac{1}{2}[n_{slow}(\omega) + n_{fast}(\omega)]. \quad [6]$$

Using the previous relationships [1–6], one can obtain expressions that can be solved for the propagation directions needed to achieve phase-matching in the principal dielectric planes, and for the rates at which the angles change with temperature.

The solved equations reveal the general behavior of biaxial crystals that can produce temperature-insensitive, phase-matching directions. The extremal points of each locus occur at different polar angles and have different rates of thermal change. If the thermal rates of change of the two pairs of extremal points of a phase-matching locus have opposite signs relative to the symmetry axis of the locus (i.e., one pair of the extremal points moves toward the axis as the other pair moves away), then the locus will distort or pivot about a set of temperature-insensitive, phase-matching points.

The phase-matching angles and their thermal rates of change were calculated for the extremal points of both type I and type II phase-matching loci for SHG of 1.064 μm radiation. These results were verified for dLAP crystals.

Measurement of Thermal Behavior of SHG Phase-Matching Loci of dLAP

The thermal behavior of the SHG phase-matching loci of dLAP was measured using an automated spindle stage apparatus developed at Lawrence Livermore National Laboratory (LLNL). The apparatus is shown schematically in FIG. 2. A Q-switched Nd:YAG laser 20 emits a beam 22 of 1.064 $\mu$m wavelength, 100 ps pulses in Q-switched bursts of approximately 200 ns duration at a repetition rate of 100 Hz. The beam 22 is collimated by lens 24, aperatured by a variable aperature 26, and is incident on a 50% beamsplitter 28. The beam 30 that is reflected from the beamsplitter 28 is frequency-doubled in a KTP crystal 32. The resulting 532 nm pulses 34 are monitored with a photodiode 36 whose output signal 38 is sent through a Stanford Research Systems (SRS) boxcar integrator to the laboratory computer, where the signal is available for normalization and diagnostic purposes.

Figure 2:
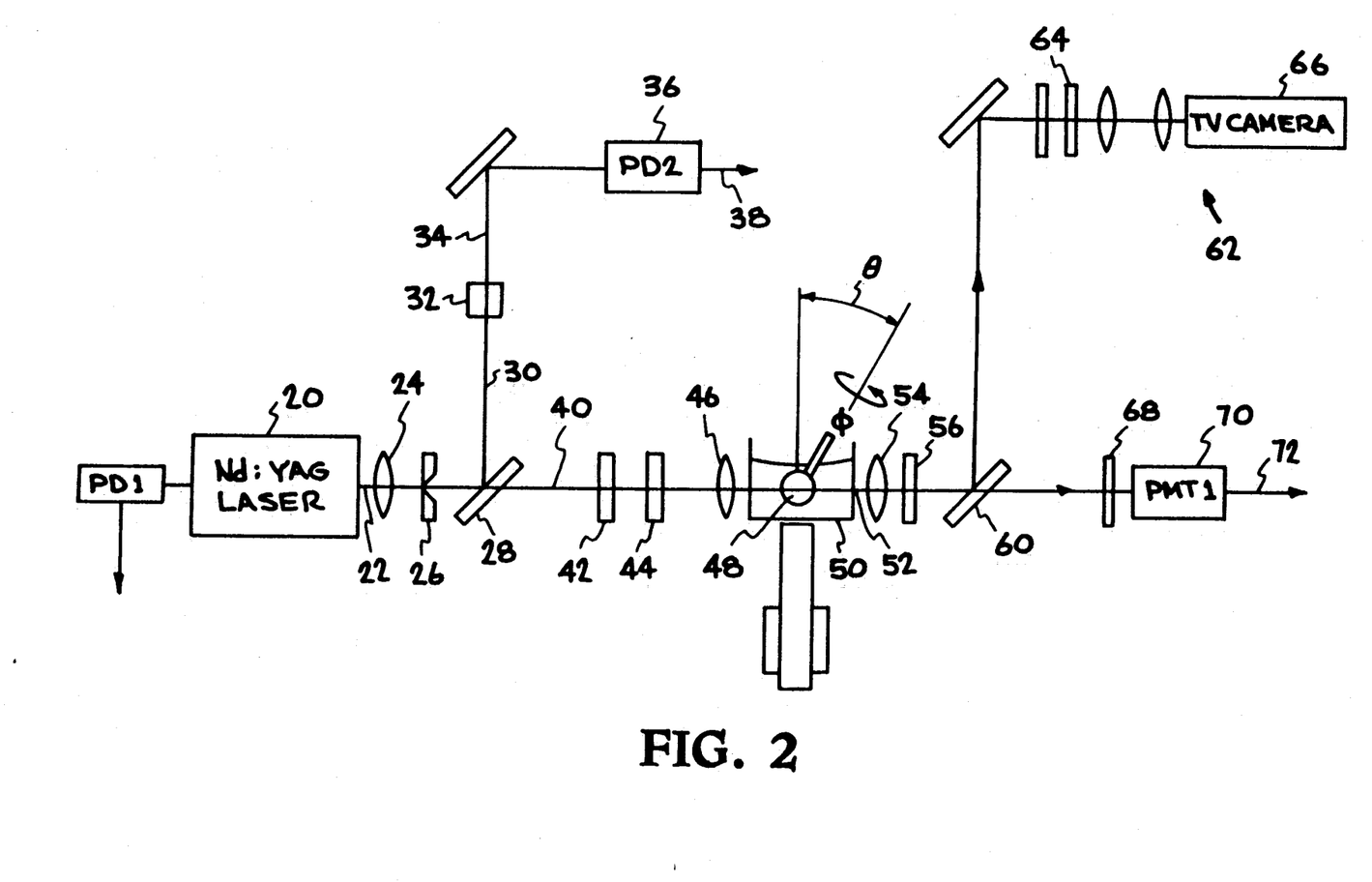
FIG. 2. Schematic diagram of an automated spindle stage apparatus.

The beam 40 that is transmitted by beamsplitter 28 is passed through a polarizer 42 and a half wave plate 44, which is mounted in a computer-controlled rotation stage to provide any desired linear polarization. The beam 40 is then focused by lens 46 (focal length 200 mm) to a diameter of approximately 300 $\mu$m onto the sample crystal 48, which is immersed in a bath 50 of temperature-controlled index matching fluid. The energy of the incident pulses is about 150 $\mu$J.

The light beam 52 emerging from the sample crystal 48 is collected with another 200 mm focal length lens 54 and passed through a depolarizer 56 to a harmonic beamsplitter 60. At the harmonic beamsplitter 60, the 1.064 $\mu$m light is reflected to an alignment diagnostic 62, which consists of a ground glass target 64 on which the position of the beam spot is monitored by a TV camera 66. The 532 nm light generated by the sample crystal 48 is transmitted by the harmonic beamsplitter 60 to a photomultiplier tube (PMT) 70, which is protected by several neutral density filters 68 and a KG5 high-pass optical filter. The output signal 72 from the PMT 70 is sent through the SRS boxcar integrator to the laboratory computer.

The crystal is mounted in a nylon collet chuck, which is attached by a two-axis rotation stage to a goniometer consisting of two high resolution (0.001°/step) Klinger motorized rotation stages, which are controlled by the laboratory computer. The crystal can be rotated through 360° about its cylindrical axis (b axis) by the designated $\phi$ rotation stage. The $\phi$ stage is attached to a pair of crossed translation stages that are carried by the designated $\theta$ rotation stage through rotations of $\pm 45°$. The $\theta$ and $\phi$ rotations provided by these stages are not the $\theta$ and $\phi$ coordinates defined in FIG. 1, and transformation between the two coordinate frames is needed.

The rotation axes of these two stages ($\theta, \phi$) are perpendicular, and the rotation axis of the $\theta$ stage is perpendicular to the path of the incident laser beam. The $\theta$ stage is mounted on a motorized translation stage whose direction of travel is orthogonal to the laser beam path. The translation stages are used to align the crystal to the rotation axis of the $\phi$ stage, to intersect the $\phi$ stage and $\theta$ stage rotation axes, and to align the center of the crystal sphere to the $\theta$ rotation axis and the line of sight of the laser beam. These alignments are performed using the TV camera to monitor the deflections of the laser beam, and a microscope 74 that provides a magnified view of the crystal as it rotates.

During the measurements, the crystal is immersed in a bath of index-matching fluid contained in an optical glass cell. The cell is enclosed in a metal housing through which constant temperature water is pumped from a temperature controlled water bath. The temperature of the crystal is monitored with a thermocouple placed near the crystal in the index-matching fluid at the same height as the laser beam.

The dLAP crystal used for the measurements was cut from a single crystal boule of 95–98.5% deuteration using diamond turning techniques at LLNL. The purpose of the high substitution of deuterium for hydrogen is to shift the absorption band of LAP out of the one micron range to reduce the heating of the crystal by the laser beam. The use of significantly less deuterated crystals will absorb more radiation and will also change the existence and direction of temperature-insensitive, phase-matching angles. Therefore, in the preferred embodiment using a dLAP crystal, the crystal is highly deuterated (at least 95%).

A rectangular piece of dLAP was fashioned into a 10 mm diameter cylinder, approximately 30 mm in length along the two-fold symmetry axis of the crystal. One end of the cylinder was machined into a spherical segment subtending a total angle of 120°, symmetric about the plane normal to the cylindrical axis. A spherical segment of this angular width allows beam access to the entire type I and type II phase-matching loci of dLAP. The finished dLAP crystal is shown schematically in FIG. 3.

Figure 3:
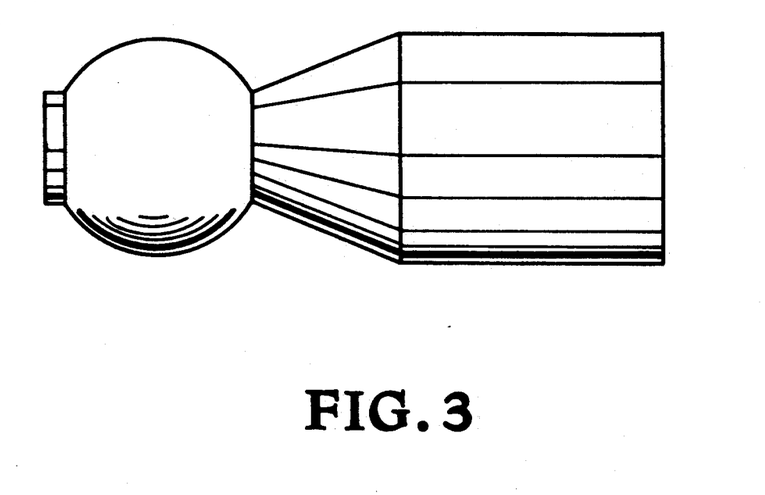
FIG. 3. A dLAP crystal machined by diamond turning techniques.

Although the spherical crystal segment is difficult to fabricate, the crystal has two advantages: constant thickness and normal incidence regardless of orientation. When the center of the crystal sphere is aligned to the laser beam, the beam is always normally incident on the crystal, no matter how the crystal is oriented. The crystal orientation can be determined directly from the rotation stage positions, without refractive beam-steering corrections. The stage apparatus measures the second harmonic intensity generated in the crystal as a function of its orientation relative to the laser beam.

Figure 4:
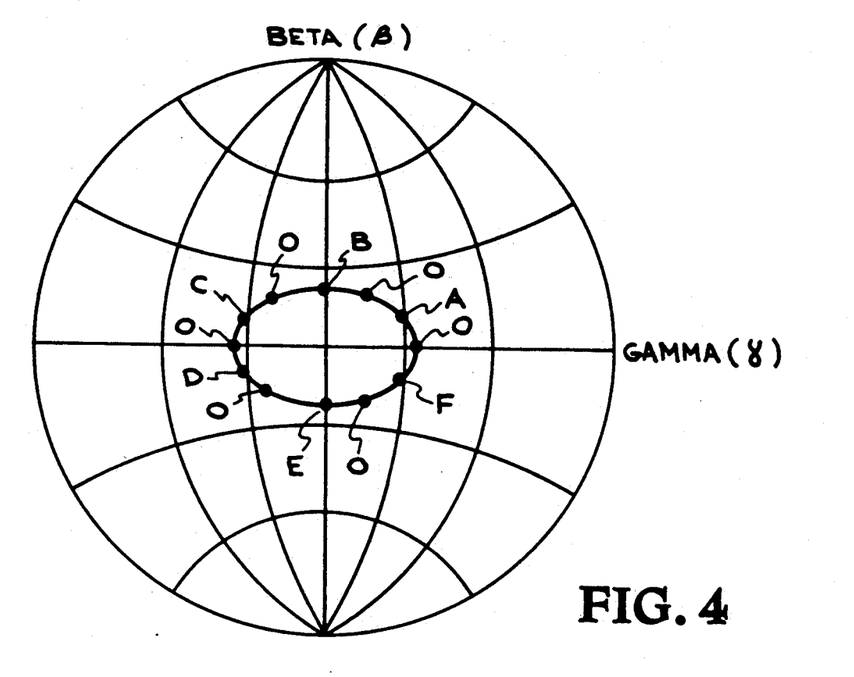
FIG. 4. Stereonet plot of type I phase-matching locus for second harmonic conversion of 1.064 $\mu$m light.
Figure 5:
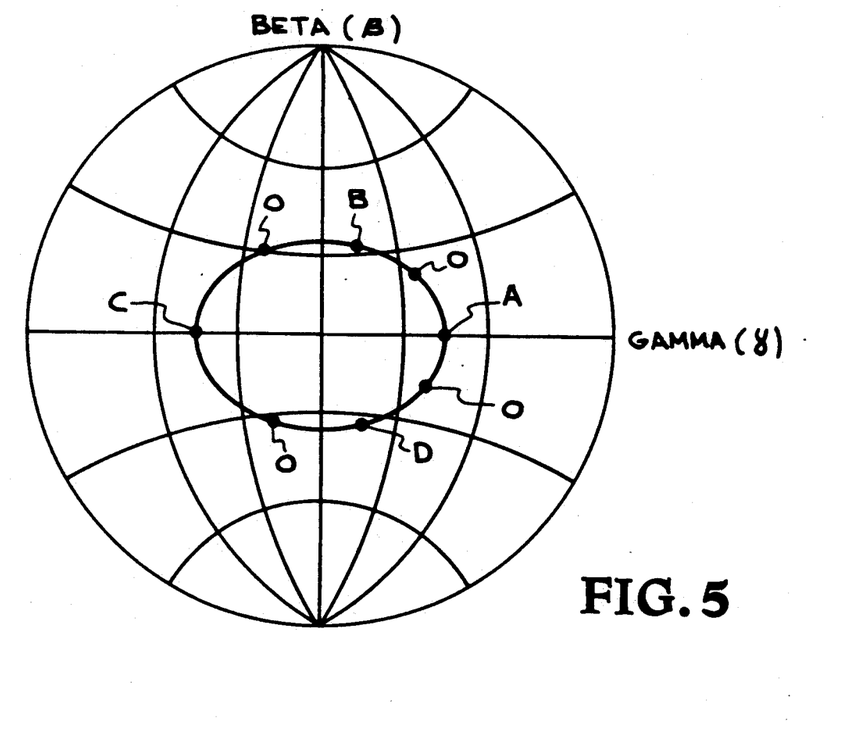
FIG. 5. Stereonet plot of type II phase-matching locus for second harmonic conversion of 1.064 $\mu$m light.

On the basis of these measurements, the second harmonic generation phase-matching loci of dLAP were characterized for a fundamental wavelength of 1.064 $\mu$m. FIGS. 4 and 5 are stereonet plots of the type I and type II phase-matching loci for second harmonic conversion of 1.064 $\mu$m light. Labels A–F on FIG. 4 and labels A–D on FIG. 5 are the directions at which the second harmonic intensity reaches a local maximum; the labels O mark the positions of minimum intensity. The maximum nonlinear coupling occurs in the type I locus at points A and F, and in the type II locus at points B and D. Because dLAP acts similarly to a negative uniaxial crystal, the measured phase-matching loci shown in FIGS. 4 and 5 can be expressed by a simple function relating the polar angle $\theta$ to the azimuthal angle $\phi$:

$$\theta = A + B \cos^2 \phi, \qquad [7]$$

where $\theta$ and $\phi$ refer the $\alpha$ axis and $\alpha$-$\gamma$ plane as shown in FIG. 1.

The angular half-width of each phase-matching locus was measured in both the $\alpha$-$\beta$ and $\alpha$-$\gamma$ planes as a function of temperature. The measurements were performed by scanning one rotation stage through the phase-matching locus, while holding the other rotation stage fixed at an orientation that causes the laser beam to propagate in one of the principal planes. To locate the intersection of the phase-matching loci with the α-β plane, the φ rotation stage was held fixed, and the θ rotation stage was scanned; the intersection points of the phase-matching loci with the α-γ plane were located by holding the θ stage fixed, and scanning the φ stage.

As the scanning stage was stepped through each intersection point, the intensity of the generated second harmonic was recorded, along with the position of the scanning stage. The resulting curve of intensity versus angle was curve-fit to determine the angle at which the peak intensity occurred. The half-width of the phase-matching locus in a principal plane is then one-half the difference of the peak intensity angles on either side of the symmetry axis of the locus, which is the α axis for dLAP for type I and type II loci.

Figure 6:
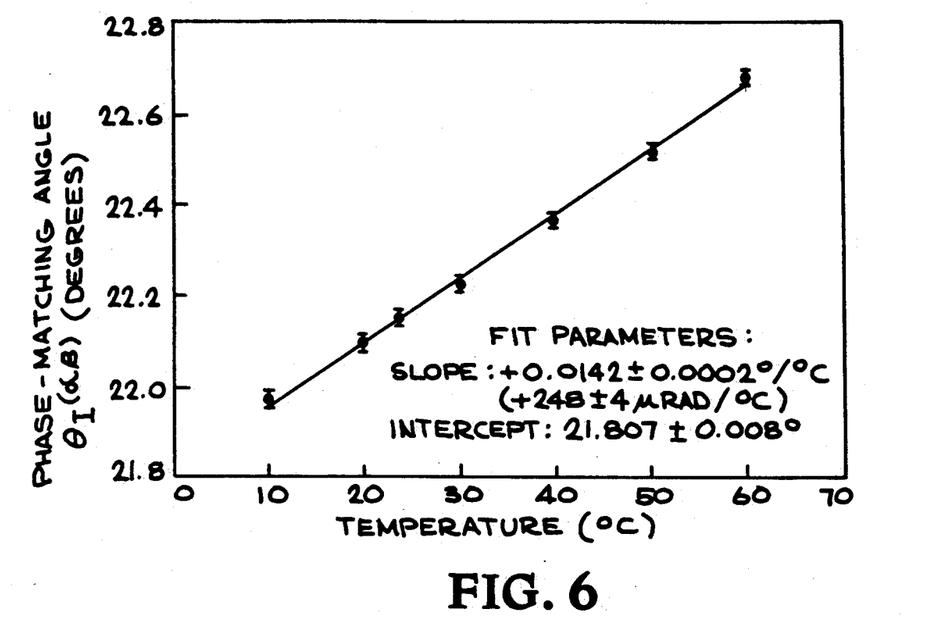
FIG. 6. Thermal dependence of phase-matching angle in the $\alpha$-$\beta$ principal dielectric plane, relative to the $\alpha$ axis, for type I SHG.
Figure 7:
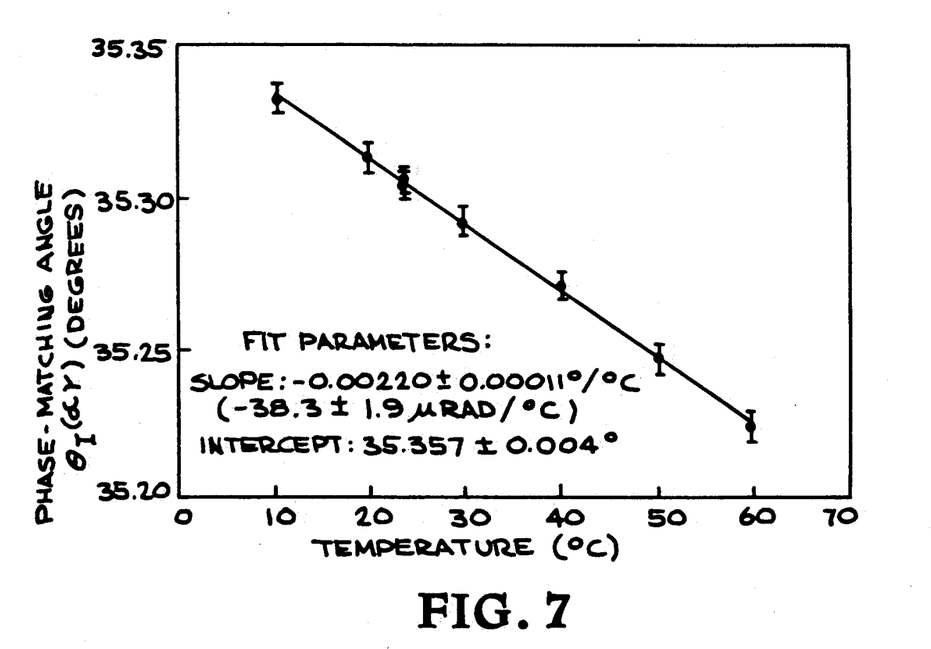
FIG. 7. Thermal dependence of phase-matching angle in the $\alpha$-$\gamma$ principal dielectric plane, relative to the $\alpha$ axis, for type I SHG.
Figure 8:
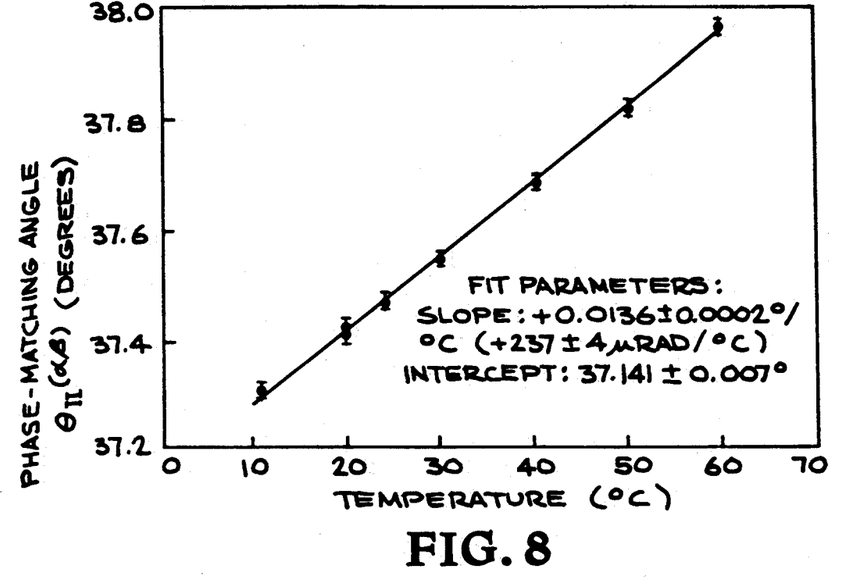
FIG. 8. Thermal dependence of phase-matching angle in the $\alpha$-$\beta$ principal dielectric plane, relative to the $\alpha$ axis, for type II SHG.
Figure 9:
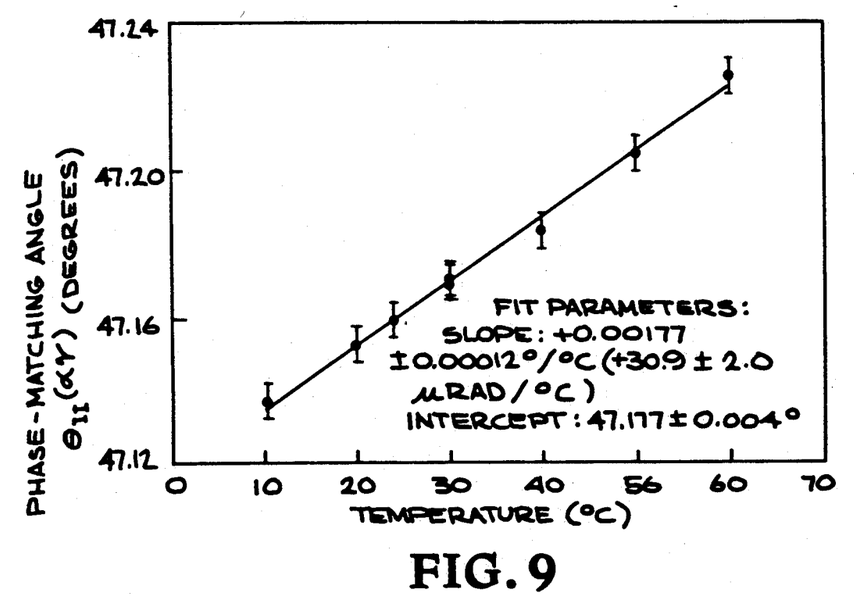
FIG. 9. Thermal dependence of phase-matching angle in the $\alpha$-$\gamma$ principal dielectric plane, relative to the $\alpha$ axis, for type II SHG.
Figure 10:
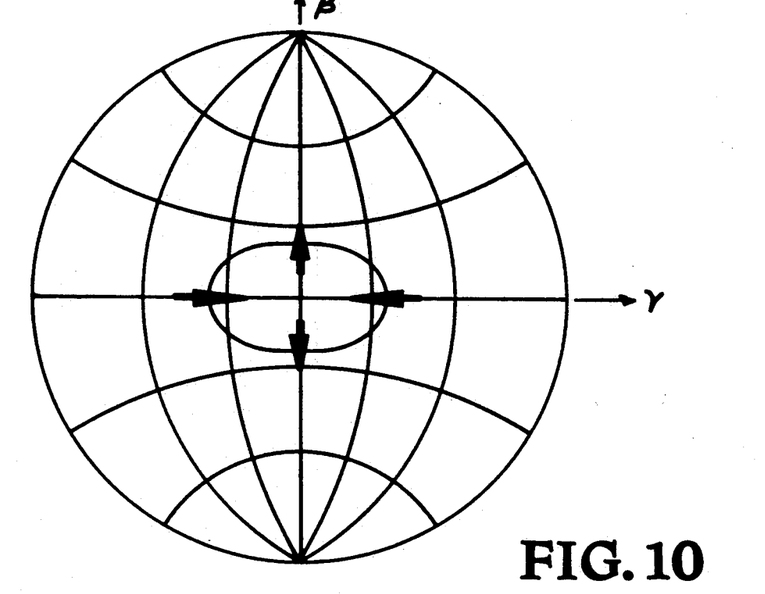
FIG. 10. Stereonet plot of type I SHG phase-matching locus for 1.064 micron light in a dLAP crystal.
Figure 11:
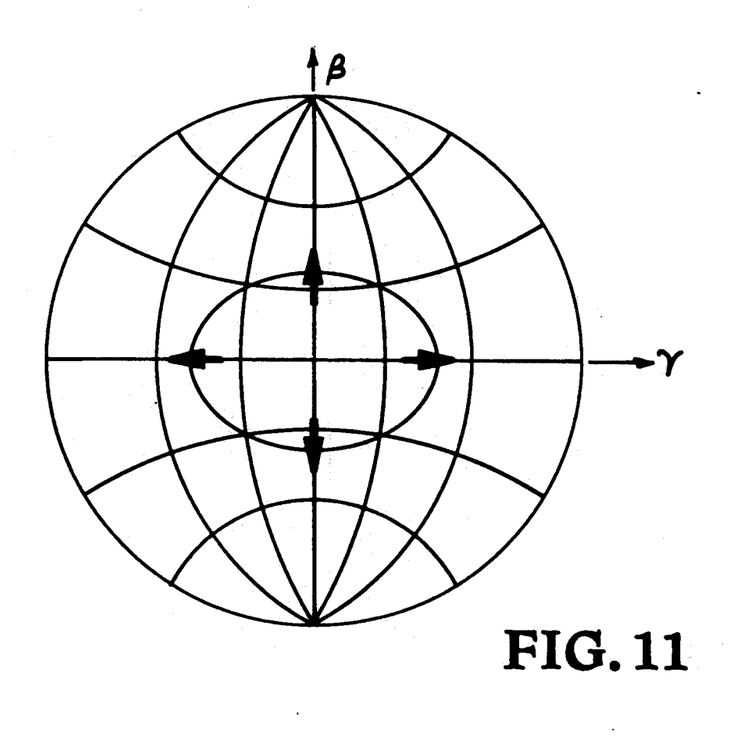
FIG. 11. Stereonet plot of type II SHG phase-matching locus for 1.064 micron light in a dLAP crystal.

FIGS. 6 and 7 show the measured type I phase-matching angles relative to the α axis in the α-β plane and the α-γ plane as a function of temperature. FIGS. 8 and 9 show the measured type II phase-matching angles relative to the α axis in the α-β plane and the α-γ plane as a function of temperature. The angles are the angular half-widths. Since the thermal rates of change in FIGS. 6 and 7 of the phase-matching angle in the two principal planes have slopes of opposite sign, the type I SHG phase-matching locus of dLAP possesses temperature-insensitive phase-matching directions. The thermal rates of change shown in FIGS. 8 and 9 have the same sign, indicating that the type II SHG phase-matching locus of dLAP has no temperature-insensitive phase-matching directions. The thermal behavior of types I and II loci is illustrated graphically on the stereonet plots in FIGS. 10 and 11. The arrows indicate the measured directions of motion of the extremal points of the locus as the temperature increases.

Reasonable estimates of the temperature-insensitive phase-matching directions can be obtained from the approximate description of the phase-matching loci given by Equation [7] and the values of $$\frac{d\theta}{dT}$$

that were measured in the principal planes. Assuming no thermal rotation of the α and γ axes, Equation [7] is differentiated with respect to temperature:

$$\frac{d\theta}{dT} = \frac{dA}{dT} + \frac{dB}{dT}\cos^2\phi. \quad [8]$$

Assuming that A and B are linear functions of temperature and thus $$\frac{dA}{dT}$$

and $$\frac{dB}{dT}$$

are constant, then $$\frac{d\theta}{dT}$$

is set at zero in Equation [8], and the equation is solved for the approximate azimuthal angles of the temperature-insensitive, phase-matching directions.

$$\phi = \cos^{-1}\left[\pm\sqrt{-\frac{\frac{dA}{dT}}{\frac{dB}{dT}}}\right] \quad [9]$$

Using Equation [8] and the measured values of $$\frac{d\theta}{dT}$$

for type I SHG phase-matching locus of dLAP, values for $$\frac{dA}{dT} \text{ and } \frac{dB}{dT}$$

can be calculated and inserted into Equation [9] to find the azimuthal angles of the locus. The azimuthal and polar angles of the temperature-insensitive directions are given in Table 1. These directions are very close to the points A, C, D, and F in FIG. 4. The effective nonlinear coupling in these directions is given relative to the peak coupling in the type I phase-matching locus. The phase-matching direction at azimuthal angle ±21.5° has a nonlinear coupling that is about 97% of the maximum, which is more than 2.5 times larger than that of a KDP type I doubler, and almost two times larger than that of a KDP type II doubler.

TABLE 1

| Temperature-insensitive type I SHG phase-matching directions | | |
|---|---|---|
| azimuthal angle φ | polar angle θ | $\frac{d_{eff}}{d_{eff}^{peak}}$ |
| ±21.5° ± 0.5° | ±33.3° ± 0.1° | 0.97 ± 0.02 |
| ±158.5° ± 0.5° | ±33.3° ± 0.1° | 0.32 ± 0.02 |

Figure 12:
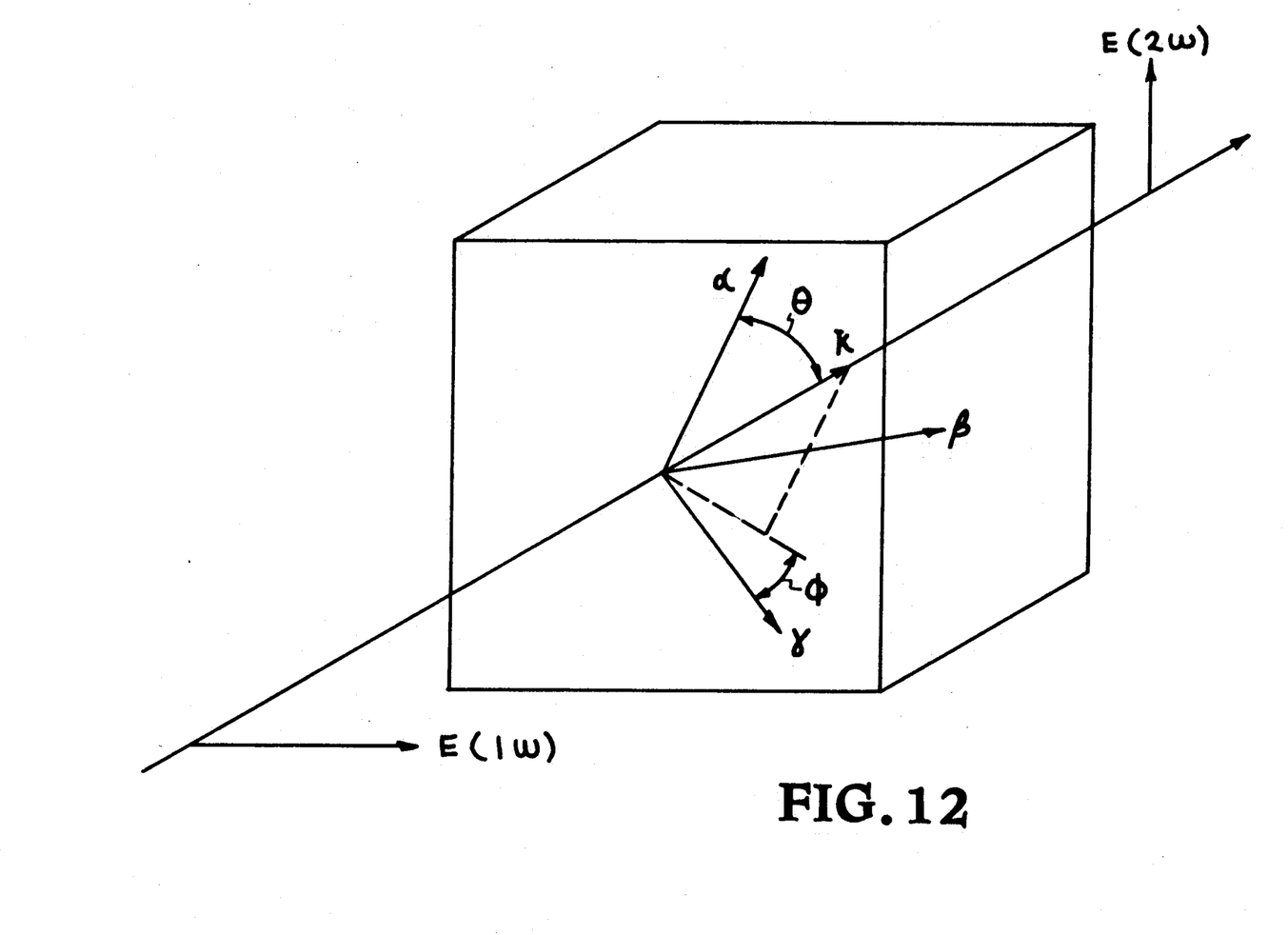
FIG. 12. Device showing crystal faces and laser beam orientation.

FIG. 12 is a schematic diagram showing the orientation of the crystal axes of a dLAP crystal with a laser beam. The relationship is shown among the crystal axes, α, β, and γ, the angles θ and φ, and the direction of propagation of the fundamental wavelength (ω) and the generated second harmonic (2ω).

Application of Method to Other Wavelengths

The foregoing description presents the method of finding temperature-insensitive, phase-matching directions in dLAP for a preferred frequency of 1.064 microns. This method can be extended to other wavelengths.

For wavelengths near 1.064 microns (about ±10%), the approximate directions of temperature-insensitive phase-matching can be found in dLAP using the procedure outlined above and in the reference "Temperature-Insensitive Phase Matching for Second-Harmonic Generation in Deuterated l-Arginine Phosphate", by Barker et al., *Journal of the Optical Society of America B*, Vol. 8, No. 12, pp. 2481-2492 (1991). The method is described more generally here, referring to the Equations and Tables in the Barker et al. article.

The following steps are performed to determine the approximate directions of temperature-insensitive phase-matching in dLAP.

(a) Calculate the principal indices of refraction (n) at a fundamental wavelength and a second harmonic wavelength using Table 1 and Equation (14):

$$n^2(\lambda) = A + \frac{B}{\lambda^2 + C} + D\lambda^2.$$

(b) Obtain $$\frac{dn}{dT}$$

values for wavelengths near 1.064 microns, assuming that $$\frac{dn}{dT}$$

values are constant as given in Table 7.

(c) Calculate the coefficients A and B for Equation (16)

$$\theta = A + B\cos^2\phi$$

using Equations (6), (7), (10), and (11).

$$\sin^2\theta_I^{(\alpha\beta)} = \frac{[1/n_\gamma^2(\omega)] - [1/n_\beta^2(2\omega)]}{[1/n_\alpha^2(2\omega)] - [1/n_\beta^2(2\omega)]} \quad (6)$$

$$\sin^2\theta_I^{(\alpha\gamma)} = \frac{[1/n_\beta^2(\omega)] - [1/n_\gamma^2(2\omega)]}{[1/n_\alpha^2(2\omega)] - [1/n_\gamma^2(2\omega)]} \quad (7)$$

$$0 = n_\gamma(\omega) + \quad (10)$$

$$\left[\frac{1}{n_\beta^2(\omega)} + \left(\frac{1}{n_\alpha^2(\omega)} - \frac{1}{n_\beta^2(\omega)}\right)\sin^2\theta_{II}^{(\alpha\beta)}\right]^{-\frac{1}{2}} -$$

$$2\left[\frac{1}{n_\beta^2(2\omega)} + \left(\frac{1}{n_\alpha^2(2\omega)} - \frac{1}{n_\beta^2(2\omega)}\right)\sin^2\theta_{II}^{(\alpha\beta)}\right]^{-\frac{1}{2}}$$

$$0 = n_\beta(\omega) + \quad (11)$$

$$\left[\frac{1}{n_\gamma^2(\omega)} + \left(\frac{1}{n_\alpha^2(\omega)} - \frac{1}{n_\gamma^2(\omega)}\right)\sin^2\theta_{II}^{(\alpha\gamma)}\right]^{-\frac{1}{2}} -$$

$$2\left[\frac{1}{n_\gamma^2(2\omega)} + \left(\frac{1}{n_\alpha^2(2\omega)} - \frac{1}{n_\gamma^2(2\omega)}\right)\sin^2\theta_{II}^{(\alpha\gamma)}\right]^{-\frac{1}{2}}$$

(d) Calculate the coefficients $$\frac{dA}{dT} \text{ and } \frac{dB}{dT}$$

for Equation (18)

$$\frac{d\theta}{dT} = \frac{dA}{dT} + \frac{dB}{dT}\cos^2\phi$$

using Equations (8), (9), (12), and (13).

(e) Solve Equation (19) to obtain the temperature-insensitive, phase-matching $\phi$ angle:

$$\phi = \cos^{-1}\left[\pm\sqrt{\frac{-\frac{dA}{dT}}{\frac{dB}{dT}}}\right].$$

(f) Solve Equation (16) to obtain the temperature-insensitive, phase-matching $\theta$ angle:

$$\theta = A + B\cos^2\phi.$$

For fundamental wavelengths far from 1.064 microns, the phase-matching locus must be calculated from Fresnel's equations for propagation in anisotropic media (see *Principles of Optics*, Born & Wolf) to determine if Equation (16) is a reasonable approximation of the description of the phase-matching locus. If so, then one can proceed with the method above, with the exception that $$\frac{dn}{dT}$$

values must be measured for the wavelengths of interest.

Application of Method to Other Crystals

Sufficient conditions may exist for the existence of temperature-insensitive, second harmonic generation, phase-matching directions in non-centrosymmetric biaxial crystals. The conditions are outlined in the Table 2 (see "Phase-Matched Second-Harmonic Generation in Biaxial Crystals", by M. V. Hobden, *Journal of Applied Physics*, Vol. 38, No. 11 (October 1967). The values for $\theta^{\alpha\beta}$, $\theta^{\alpha\gamma}$, and $\theta^{\beta\gamma}$ are obtained by the same procedures as described by Equations (1) through (13). The formulae will be identical, except for permutations of $\alpha$, $\beta$, $\gamma$ in refractive indices.

TABLE 2

Calculation of temperature-insensitive SHG phase-matching directions in biaxial crystals

| Phase-matching Type | Reference Axis (polar axis; symmetry axis) | Hobden phase-matching class | Condition to be satisfied by calculated or measured thermal rates of change of phase matching angle in the principal planes |
|---|---|---|---|
| I | $\alpha$ | 9, 10, 11 | $\text{sign}(\pm)\frac{d\theta^{\alpha\beta}}{dT} \neq \text{sign}(\pm)\frac{d\theta^{\alpha\gamma}}{dT}$ |
| | $\beta$ | 12, 13 | $\text{sign}(\pm)\frac{d\theta^{\alpha\beta}}{dT} \neq \text{sign}(\pm)\frac{d\theta^{\beta\gamma}}{dT}$ |
| | $\gamma$ | 6, 7, 8 | $\text{sign}(\pm)\frac{d\theta^{\alpha\gamma}}{dT} \neq \text{sign}(\pm)\frac{d\theta^{\beta\gamma}}{dT}$ |

TABLE 2-continued
Calculation of temperature-insensitive SHG phase-matching directions in biaxial crystals

| Phase-matching Type | Reference Axis (polar axis; symmetry axis) | Hobden phase-matching class | Condition to be satisfied by calculated or measured thermal rates of change of phase matching angle in the principal planes |
|---|---|---|---|
| II | α | 3, 9 | $\text{sign}(\pm) \frac{d\theta^{\alpha\beta}}{dT} \neq \text{sign}(\pm) \frac{d\theta^{\alpha\gamma}}{dT}$ |
|  | β | 4, 7, 10, 12 | $\text{sign}(\pm) \frac{d\theta^{\alpha\beta}}{dT} \neq \text{sign}(\pm) \frac{d\theta^{\beta\gamma}}{dT}$ |
|  | γ | 2, 6 | $\text{sign}(\pm) \frac{d\theta^{\alpha\gamma}}{dT} \neq \text{sign}(\pm) \frac{d\theta^{\beta\gamma}}{dT}$ |

The foregoing description of preferred embodiments of the invention has been presented for purposes of illustration and description and is not intended to be exhaustive or to limit the invention to the precise form disclosed. Many modifications and variations are possible in light of the above teaching. The scope of the invention is defined by the following claims.

We claim:

1. A method for determining temperature-insensitive, phase-matching directions ($\theta,\phi$) for optical harmonic conversion of a laser beam incident on a crystalline body having principal axes α, β, and γ, comprising the steps:

(a) determining the principal indices of refraction ($n_\alpha$, $n_\beta$, $n_\gamma$) for each of the principal axes of the crystalline body at a fundamental wavelength and a second harmonic wavelength;

(b) obtaining $$\frac{dn}{dT}$$

values for the principal axes at wavelengths at or on either side of the fundamental wavelength, where T represents temperature;

(c) calculating coefficients A and B of the equation $$\theta = A + B \cos^2\phi,$$

where $\theta$ represents a polar angle, and $\phi$ represents an azimuthal angle;

(d) calculating coefficients $$\frac{dA}{dT} \text{ and } \frac{dB}{dT}$$

for the equation $$\frac{d\theta}{dT} = \frac{dA}{dT} + \frac{dB}{dT} \cos^2\phi;$$

(e) obtaining a temperature-insensitive, phase-matching angle $\phi$ by solving the equation $$\phi = \cos^{-1}\left[\pm \sqrt{\frac{-\frac{dA}{dT}}{\frac{dB}{dT}}}\right]; \text{ and}$$

(f) obtaining a temperature-insensitive, phase-matching angle $\theta$ by solving the equation $$\theta = A + B \cos^2\phi.$$

2. A method as recited in claim 1, wherein the fundamental wavelength is about 1.064 microns, and the crystalline body comprises deuterated l-arginine phosphate.

3. A method for generating a temperature-insensitive, phase-matched, second harmonic response from coherent light radiation at a fundamental wavelength of about 1.064 microns, comprising:

providing a laser beam of coherent light radiation at the fundamental wavelength;

providing a crystalline body comprising deuterated l-arginine phosphate, having an input face and an output face through which the laser beam passes, and having alpha, beta, and gamma axes that are principal dielectric axes of the crystalline body, defined so that the indices of refraction (n) satisfy the relation: $n_\alpha < n_\beta < n_\gamma$; and positioning the crystalline body relative to the laser beam such that the normal directions of the input and output faces lie at a polar angle of about 33.3° relative to the alpha axis of the crystal and about an azimuthal angle relative to the alpha-gamma plane of the crystal selected from the group consisting of +21.5°, −21.5°, +158.5°, and −158.5°.

4. A temperature-insensitive, phase-matched, optical harmonic conversion device for a laser beam at a fundamental wavelength of about 1.064 microns, comprising:

a deuterated l-arginine phosphate crystal, having an input face and an output face through which the laser beam passes, and having alpha, beta, and gamma axes that are principal dielectric axes of the crystal, wherein the indices of refraction (n) for the three axes satisfy this relation: $n_\alpha < n_\beta < n_\gamma$; and wherein the normal directions of the input and output faces lie at a polar angle of about 33.3° relative to the alpha axis of the crystal and at about an azimuthal angle relative to the alpha-gamma plane of the crystal selected from the group consisting of +21.5°, −21.5°, +158.5°, and −158.5°.

5. The conversion device as recited in claim 4, wherein the crystal has a deuteration percentage of at least 95%.